No. 668,373. Patented Feb. 19, 1901.
C. P. FRITZ.
HANDPIECE.
(Application filed June 23, 1900.)
(No Model.)
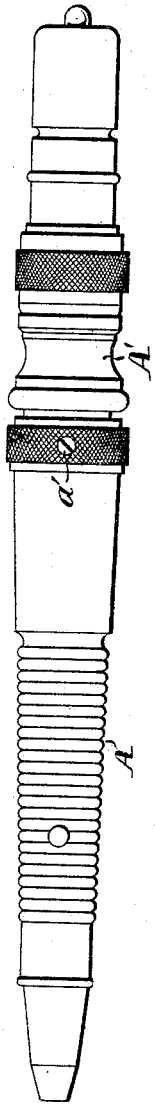
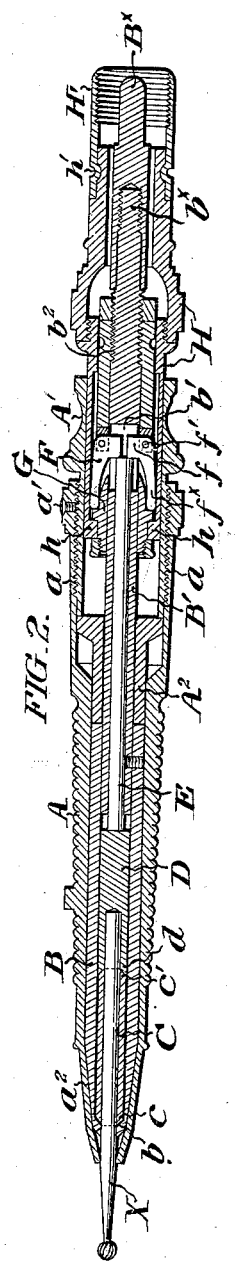
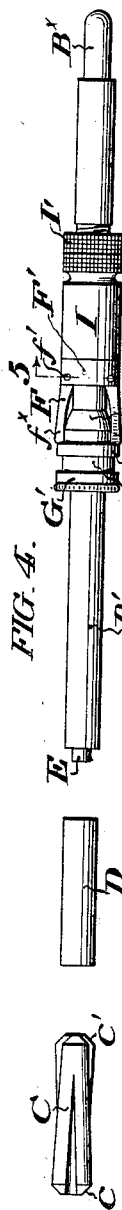
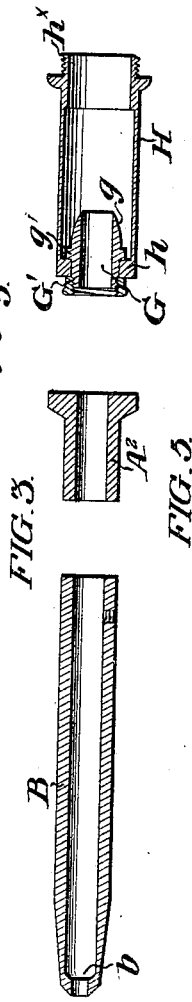
WITNESSES:
E. L. Fullerton.
Clifton C. Hallowell.
INVENTOR:
CHARLES P. FRITZ,
by Arthur E. Paige
Atty.

UNITED STATES PATENT OFFICE.

CHARLES P. FRITZ, OF PHILADELPHIA, PENNSYLVANIA.

HANDPIECE.

SPECIFICATION forming part of Letters Patent No. 668,373, dated February 19, 1901.

Application filed June 23, 1900. Serial No. 21,388. (No model.)

*To all whom it may concern:*

Be it known that I, CHARLES P. FRITZ, of Philadelphia, in the State of Pennsylvania, have invented certain new and useful Improvements in Handpieces, whereof the following is a specification, reference being had to the accompanying drawings.

My invention relates to chuck devices adapted to detachably clamp a drill or similar tool with respect to a rotary shaft to be actuated by the latter in the hand of the operator.

It is the object of my invention to provide a handpiece with tool-clamping mechanism consisting of few and simple parts so related as to be conveniently adjusted to efficiently clamp tools of differing diameters or to compensate for the wear of the parts.

In the accompanying drawings, Figure 1 is a side elevation of a convenient form of my invention with the parts in the position in which the tool is disengaged. Fig. 2 is a sectional view of the handpiece shown in Fig. 1 with a tool clamped therein. Fig. 3 shows certain of the parts in section. Fig. 4 shows in side elevation the clamping mechanism of the handpiece. Fig. 5 is a sectional view taken on the line 5 5 of Fig. 4.

The exterior casing of the handpiece comprises a front member A and a rear member A'. Said two parts are in threaded engagement, as indicated at $a$, and are adjusted longitudinally and fixed by the set-screw $a'$ to determine the position of the bearing-sleeve $A^2$. The tubular spindle B is mounted for rotation in the casing member A, bearing at its forward end upon the interior cone-surface $a^2$ of the casing A and being maintained in proper relation therewith by the sleeve $A^2$, bearing upon its rear extremity. Said tubular spindle B is operatively connected with the rotary driven shaft B' and is provided with a split spring-chuck C, so formed as to normally be of larger internal diameter than the tool which it is to clamp. The opposite ends $c\ c'$ of said chuck are respectively seated in the conical end $b$ of the spindle B and the conical end $d$ of the clamp-block D, the relation of the parts being such that when said clamp-block D is free to move rearward the chuck C expands and releases the tool, but when said block is thrust forward into the position indicated in Fig. 2 the opposite ends of said chuck are engaged and contracted to clamp the tool X.

The clamp-block D is thrust forward to clamping position by means of the cylindrical bar E, which is mounted for reciprocation in the shaft B'. Said shaft B' is slotted at $b'$, and the levers F are fulcrumed at $f'$ in the collar F' and entered in said slot with their short arms $f$ in engagement with the rear extremity of the bar E. The sleeve G is loosely mounted upon the shaft B' with its conical extremity $g$ presented beneath the long arms $f^\times$ of the levers F. Said sleeve G is mounted for rotation in the sleeve H, but is caused to reciprocate therewith by means of the nut G' and flange $g'$ upon the sleeve G, which encounters the opposite sides of the flange $h$ of the sleeve H.

The shaft B' is coupled at $b^\times$ with a flexible driving-shaft, of which I have only shown the rigid extremity $B^\times$. The sleeve H is coupled, by means of the threaded thimble H', with a flexible casing inclosing said shaft $B^\times$, and for the greater freedom of movement of the parts said thimble H' is in swiveled engagement with said sleeve H, as indicated at $h'$.

The relation of the parts above described is such that when a tool is inserted in the spindle B and the casing A A' is drawn forward upon the sleeve H the levers F are also drawn forward by the shaft B', and the long arms of said levers being separated by the cone-sleeve G the bar E is thrust forward, the chuck C contracted at its opposite extremities, and the tool thereby clamped. In the clamped position of the parts the forward extremities of the arms $f^\times$ of the levers F rest upon the cylindrical portion of the sleeve G at the base of the cone $g$, so that the automatic release of the parts is prevented. The tool is released by reverse movement of the casing A A' upon the sleeve H from the position shown in Fig. 2 to that shown in Fig. 1. Said reverse movement of the parts withdraws the cone-sleeve G from engagement with the levers F and permits the chuck C to expand, thrusting the clamp-block D and bar E rearward.

Although tools adapted for use in a handpiece are ordinarily made of a standard diameter, said diameter is slightly reduced each time a tool is sharpened and repolished, so that although for the purpose of clamping and releasing a tool the collar F' may be permanently fixed upon the shaft B', I find it convenient to render the mechanism adjustable to clamp tools of reduced diameter and also to compensate for the wear of the parts by mounting the collar F' loosely upon the shaft B', determining the longitudinal position of the collar upon the shaft by means of the nut I, which is in threaded engagement with the shaft B', as indicated at $b^2$, and preventing the accidental disturbance of said adjustment by the jam-nut I', which bears upon the nut I. As shown in Fig. 4, said nuts I I' are knurled at $i$ $i'$ to facilitate their manipulation, the sleeve H being separable at the screw-threaded joint $h^\times$ to give access to said nuts.

It is to be understood that during the normal operation of the handpiece with a tool engaged therein the casing members A A', the bearing-sleeve $A^2$, and the sleeve H are relatively fixed and stationary, while the spindle B and the parts contained therein rotate, together with the shaft B', levers F, cone-sleeve G, and adjusting-nuts I I', being actuated by the driving-shaft $B^\times$.

I am aware that certain of the parts described as comprised in my improved handpiece are well known in this art. I believe it to be new, however, to provide such a handpiece with clamping mechanism of the peculiar character herein set forth. I therefore do not desire to limit myself to the precise construction which I have shown and described, as it is obvious that various modifications may be made therein without departing from the spirit of my invention.

I claim—

1. In a handpiece, the combination with an outer casing, of a tubular spindle mounted for rotation in said casing, mechanism to clamp a tool in said spindle, comprising a lever mounted to rotate with said spindle, and an inclined member, independent of said spindle, arranged to shift said lever to clamp said tool, substantially as set forth.

2. In a handpiece, the combination with an outer casing, of a tubular spindle mounted for rotation in said casing, mechanism to clamp a tool in said spindle comprising a lever mounted to rotate with said spindle, an inclined member, independent of said spindle, arranged to rock said lever to clamp said tool, and a sleeve in slidable relation with said outer casing arranged to reciprocate said inclined member, substantially as set forth.

3. In a handpiece, the combination with an outer casing, of a tubular spindle mounted for rotation in said casing, mechanism to clamp a tool in said spindle, comprising a lever mounted to rotate with said spindle, means to adjustably shift the fulcrum of said lever, and a conical member arranged to rock said lever to clamp said tool, substantially as set forth.

4. In a handpiece, the combination with an outer casing, of a tubular spindle mounted for rotation in said casing, a spring-chuck in said spindle, a clamp-block in said spindle engaged with said chuck, a thrust-bar mounted to slide in said spindle, a lever mounted to rotate with said spindle in engagement with said thrust-bar, a conical sleeve, independent of said spindle, operatively related to said lever, and adapted to rotate with said spindle, and means to shift said conical sleeve to clamp said tool, substantially as set forth.

5. In a handpiece, the combination with an outer casing, of a tubular spindle mounted for rotation in said casing, a spring-chuck in said head, a clamp-block in said spindle engaged with said chuck, a hollow shaft extending from said spindle in fixed relation therewith, a thrust-bar mounted to slide in said hollow shaft, a slot in said shaft, a collar mounted upon said shaft, opposed levers fulcrumed in said collar and entered in said slot in engagement with said thrust-bar, a conical sleeve mounted to slide upon the said hollow shaft, in engagement with said levers, and a sleeve in slidable relation with said outer casing, arranged to reciprocate said conical sleeve, substantially as set forth.

6. In a handpiece, the combination with an outer casing, of a tubular spindle mounted for rotation in said casing, a spring-chuck in said spindle, a clamp-block in said spindle engaged with said chuck, a hollow shaft extending from said spindle in fixed relation therewith, a thrust-bar mounted to slide in said hollow shaft, a slot in said shaft, a collar mounted upon said shaft, opposed levers fulcrumed in said collar and entered in said slot in engagement with said thrust-bar, a conical sleeve mounted to slide upon said hollow shaft, in engagement with said levers, a sleeve in slidable relation with said outer casing, arranged to reciprocate said conical sleeve, and means to adjust said collar with respect to said spindle, substantially as set forth.

7. In a handpiece, the combination with an outer casing, of a tubular spindle mounted for rotation in said casing, a spring-chuck in said head, a clamp-block in said head engaged with said chuck, a hollow shaft extending from said spindle in fixed relation therewith, a thrust-bar mounted to slide in said hollow shaft, a slot in said shaft, a collar mounted upon said shaft, opposed levers fulcrumed in said collar and entered in said slot in engagement with said thrust-bar, a conical sleeve mounted to slide upon said hollow shaft, in engagement with said levers, a sleeve in slidable relation with said outer casing arranged to reciprocate said conical sleeve, a nut to adjust said collar with respect to said spindle, and means to fix said parts in adjusted position, substantially as set forth.

CHARLES P. FRITZ.

Witnesses:
ARTHUR E. PAIGE,
E. L. FULLERTON.